US012176631B1

(12) United States Patent
Salem et al.

(10) Patent No.: US 12,176,631 B1
(45) Date of Patent: Dec. 24, 2024

(54) ELECTRICALLY SMALL WIDEBAND RESONANT LOOP ANTENNA SYSTEMS AND METHODS

(71) Applicant: BAE Systems Space & Mission Systems Inc., Broomfield, CO (US)

(72) Inventors: Matthew Salem, Westminster, CO (US); Cesar Garcia, Westminster, CO (US)

(73) Assignee: BAE Systems Space & Mission Systems Inc., Broomfield, CO (US)

( * ) Notice: Subject to any disclaimer, the term of this patent is extended or adjusted under 35 U.S.C. 154(b) by 576 days.

(21) Appl. No.: 17/391,897

(22) Filed: Aug. 2, 2021

Related U.S. Application Data

(60) Provisional application No. 63/062,062, filed on Aug. 6, 2020.

(51) Int. Cl.

| | |
|---|---|
| ***H01Q 7/00*** | (2006.01) |
| ***H01Q 1/28*** | (2006.01) |
| ***H01Q 1/48*** | (2006.01) |
| ***H01Q 21/22*** | (2006.01) |

(52) U.S. Cl.

CPC ................. *H01Q 7/00* (2013.01); *H01Q 1/28* (2013.01); *H01Q 1/48* (2013.01); *H01Q 21/22* (2013.01)

(58) Field of Classification Search

CPC .......... H01Q 1/243; H01Q 13/18; H01Q 1/48; H01Q 5/378; H01Q 9/0457; H01Q 13/106

See application file for complete search history.

(56) References Cited

U.S. PATENT DOCUMENTS

| | | | | |
|---|---|---|---|---|
| 4,907,006 A * | 3/1990 | Nishikawa | H01Q 5/378 343/828 |
| 6,300,909 B1 * | 10/2001 | Tsubaki | H01Q 19/005 343/702 |
| 10,177,451 B1 * | 1/2019 | Baraban | H04B 1/1027 |
| 11,482,794 B1 * | 10/2022 | Salem | H01Q 21/24 |

(Continued)

FOREIGN PATENT DOCUMENTS

| | | | |
|---|---|---|---|
| CN | 113078448 A * | 7/2021 | H01Q 1/273 |
| EP | 3843208 B1 * | 9/2023 | H01Q 1/48 |

(Continued)

OTHER PUBLICATIONS

Notice of Allowance for U.S. Appl. No. 17/537,758, dated Feb. 21, 2023 8 pages.

*Primary Examiner* — Ricardo I Magallanes
(74) *Attorney, Agent, or Firm* — Sheridan Ross P.C.

(57) ABSTRACT

Systems and methods for providing an electrically small antenna are provided. The antenna can include an arm or a pair of arms disposed on a surface of a substrate. The substrate and the arm or arms are generally disposed in an aperture or volume formed in a housing. A capacitive gap is provided between the arm and the housing, or between the arms. Where the antenna includes a pair of arms, each arm generally includes a main portion disposed on the first surface of the substrate and a perpendicular portion that extends from the first surface of a substrate towards a ground plane on a second surface of the substrate. The perpendicular portions of the arms face one another. In addition, the main portions of the arms can be tapered in plan view. A ground plane can be provided on the second surface side of the substrate.

19 Claims, 6 Drawing Sheets

(56) References Cited

U.S. PATENT DOCUMENTS

2004/0036653 A1* 2/2004 Ishihara ................. H01Q 5/378
343/702
2004/0104860 A1* 6/2004 Durham ................. H01Q 1/405
343/785
2004/0140935 A1* 7/2004 Korva .................... H01Q 1/243
343/702
2006/0066488 A1* 3/2006 Zhinong .............. H01Q 9/0421
343/702
2006/0227052 A1* 10/2006 Tavassoli Hozouri ... H01Q 9/36
343/700 MS
2012/0154237 A1* 6/2012 Ying ...................... H01Q 5/378
343/833
2017/0338558 A1 11/2017 West
2018/0205134 A1* 7/2018 Khan ..................... H01Q 5/314
2018/0316098 A1* 11/2018 Amadjikpe .......... H01Q 19/005
2019/0013585 A1* 1/2019 Iida ...................... H01Q 9/0435
2019/0027838 A1* 1/2019 Paulotto ............... H01Q 21/065
2019/0157768 A1* 5/2019 Liu ........................ H01Q 1/246
2019/0334246 A1* 10/2019 Obata ...................... H01Q 1/52
2020/0006842 A1* 1/2020 Zhu .......................... H01Q 5/30
2020/0076055 A1* 3/2020 Jeon ....................... H01Q 21/06
2020/0194894 A1* 6/2020 Yanagi ..................... H01Q 9/42
2020/0266528 A1* 8/2020 Nikolayev ............. A61B 5/076
2021/0013627 A1 1/2021 Goto et al.
2021/0091473 A1* 3/2021 Lee ........................ H01Q 21/22
2021/0091476 A1* 3/2021 Judd ........................ H01Q 1/48
2021/0098894 A1* 4/2021 Haviv .................. H01Q 21/062
2022/0140464 A1* 5/2022 Tenno .................. H05K 1/0237
343/878
2022/0173506 A1* 6/2022 Okabe .................... H01Q 1/243
2022/0359988 A1* 11/2022 Yoshikawa .............. H01Q 1/24
2022/0393705 A1* 12/2022 Lee ....................... H04M 1/026
2022/0407233 A1* 12/2022 Woo ..................... H04B 7/0617
2023/0021498 A1* 1/2023 Yoshikawa .............. H01Q 5/10
2023/0046168 A1* 2/2023 Byun ................... H01Q 9/0457
2023/0084538 A1* 3/2023 Mu .......................... H01Q 1/22
343/702
2023/0101577 A1* 3/2023 Yong ...................... H01Q 19/06
343/860
2023/0216178 A1* 7/2023 Choi ........................ H01Q 1/50
343/702
2023/0420830 A1* 12/2023 Papantonis .......... G04G 17/045

FOREIGN PATENT DOCUMENTS

WO WO-2010049984 A1 * 5/2010 ....... G06K 19/07771
WO WO 2018/077408 5/2018
WO WO-2018077408 A1 * 5/2018
WO WO-2021085665 A1 * 5/2021 ............. H01Q 1/243

* cited by examiner

ELECTRICALLY SMALL WIDEBAND RESONANT LOOP ANTENNA SYSTEMS AND METHODS

CROSS-REFERENCE TO RELATED APPLICATIONS

This application claims the benefit of U.S. Provisional Patent Application Ser. No. 63/062,062, filed Aug. 6, 2020, the entire disclosure of which is hereby incorporated herein by reference.

FIELD

Electrically small antennas capable of operating at relatively low frequencies are provided.

BACKGROUND

It is often desirable to provide antennas that can be integrated into associated vehicles or platforms, while providing acceptable performance characteristics. Indeed, the desire for lowband and other relatively low frequency antennas for use in various applications has increased in recent years. In addition, antennas that conform to an exterior surface of a vehicle are often preferred in various aerospace applications.

Although providing acceptable antenna performance can be a challenge at any operating frequency, integrating antennas designed to operate at relatively low frequencies into a vehicle or other platform having stringent packaging constraints has been especially difficult. In particular, antennas designed to operate at relatively low frequencies are generally larger than antennas designed to operate at relatively high frequencies. As a result, typical lowband (HF-VHF) antennas are large, heavy and expensive. Moreover, typical lowband antennas are often incapable of being deployed as conformal devices. When typical antenna designs are modified to conform to the size and weight constraints of many vehicles, the resulting antennas can suffer from very narrowband performance.

More particularly, most electrically small antennas consist of inductively loaded dipoles or large coupled magnetic loops. These antennas are typically very narrowband (~10% fractional bandwidth). In addition, typical electrically small antennas have a kr value of 0.2-0.4; where k is the wavenumber and r is the largest dimension of the antenna. Accordingly, it would be desirable to provide an electrically small antenna that supported operations over a relatively wide bandwidth, and that had a smaller kr value than other designs.

SUMMARY

In accordance with embodiments of the present disclosure, electrically small resonant loop antennas capable of supporting relatively wide operating bandwidths are provided. In accordance with at least some embodiments of the present disclosure, the antenna includes a conductive housing having an aperture generally surrounding an antenna element. An antenna as disclosed herein can be implemented using conventional printed antenna board (PAB) techniques, and can be in the form of a coaxial cable feed resonant loop. As a result of the size advantages of antennas configured in accordance with embodiments of the present disclosure, they can be more easily integrated onto size constrained platforms than other antenna configurations. Embodiments of the present disclosure can provide an antenna that approaches the Chu Limit, which describes how the bandwidth of an antenna is degraded as the electrical size is reduced, for an antenna of its size and bandwidth.

In accordance with at least some embodiments of the present disclosure, an antenna element having first and second arms disposed on a substrate is provided. The arms and the substrate can be disposed within an aperture formed in an enclosure. The first and second arms face one another across a gap. In accordance with embodiments of the present disclosure, the first and second arms include main portions formed on a first surface of the substrate. In addition, a structure at an angle to the main portions of the arms, referred to herein as a vertical or perpendicular structure is formed extending generally perpendicular from the first and second main portions respectively. More particularly, the perpendicular structure or portion of the first arm faces the perpendicular structure or portion of the second arm, and forms a capacitive gap between the first arm the second arm. Although referred to as perpendicular portions to distinguish the facing portions of the arms from the main portions, it should be appreciated that these portions are at an angle (e.g. are perpendicular or at some other non-zero angle) to the respective main portions of the arms. In accordance with at least some embodiments of the present disclosure, the "perpendicular" portions are formed at complementary angles relative to one another, such that the width of the capacitive gap formed between them is constant or nearly constant. In addition, the first arm can be connected to a feed by a feed via or connection, and the second arm can be connected to the enclosure which is in turn connected to a ground plane that extends across a second surface of the substrate.

In accordance with other embodiments of the present disclosure, an antenna element having a single arm disposed on a substrate is provided. The arm and the substrate can be disposed in an aperture in an enclosure. A first end of the arm is connected to a feed by a feed via or connection. The arm is spaced apart from the enclosure. Moreover, a capacitive gap is formed between a second end of the arm and the enclosure.

An antenna element incorporating first and second arms or a single arm as disclosed herein can be manufactured singly or as part of an array of elements using common printed circuit board (PCB), also referred to herein as printed antenna board (PAB) techniques. For example, the ground plane and arms of the antenna element can be formed from conductive layers of a multi-layer board or structure. The capacitive or perpendicular features or portions can be formed by plating the edges of walls formed on a substrate or insulating layer. Other structures such as the feed and ground via can be formed as plated vias. Accordingly, embodiments of the present disclosure can be manufactured simply and inexpensively using conventional build processes.

Additional features and advantages of embodiments of the disclosed antenna systems and methods will become more readily apparent from the following description, particularly when taken together with the accompanying drawings.

DETAILED DESCRIPTION

Figure 1:
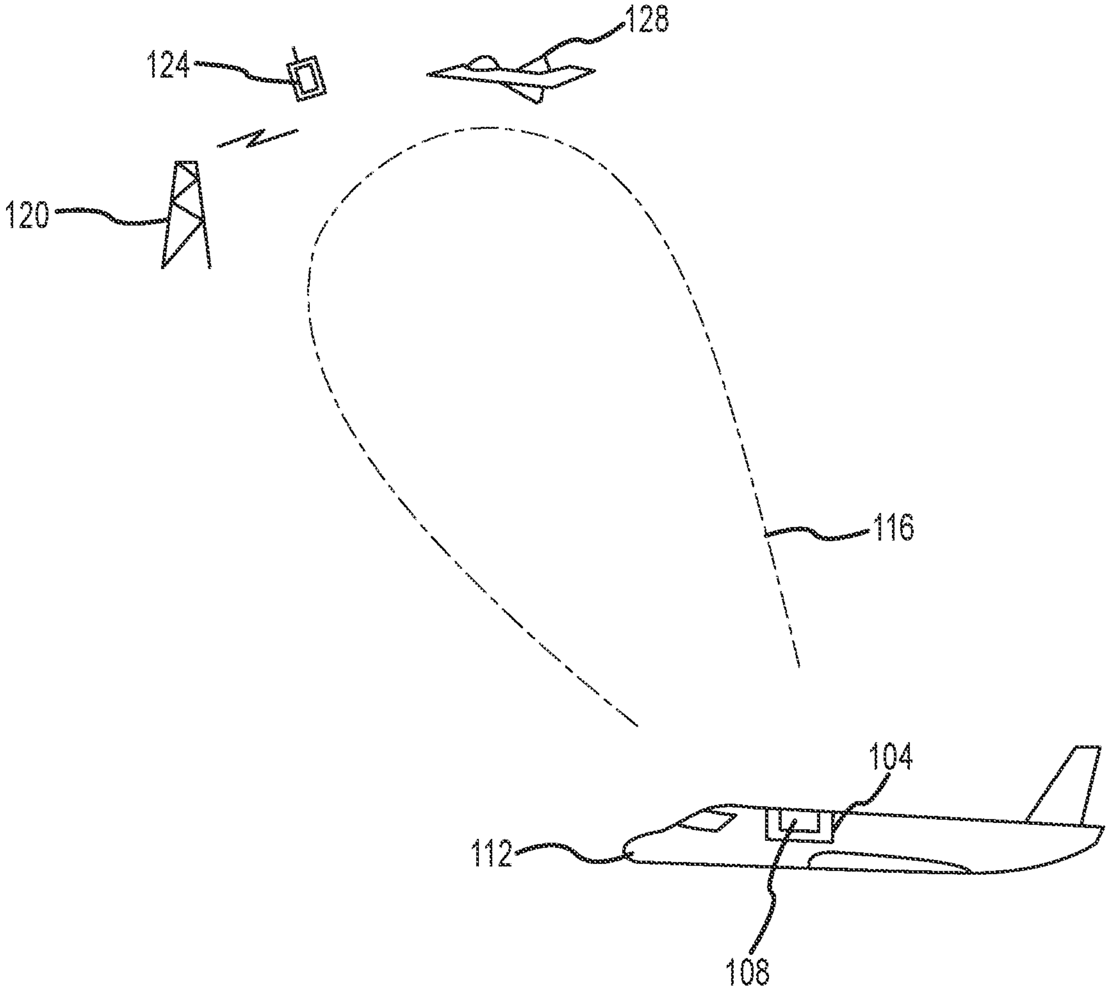
FIG. 1 depicts an antenna system including an antenna incorporating an antenna element in accordance with embodiments of the present disclosure mounted to a vehicle in an example operational scenario.

As depicted in FIG. 1, an antenna system 104 incorporating an antenna element 108 can be mounted to a platform 112, such as but not limited to a tower, aircraft, missile, ship, truck, or any other vehicle, device, or stationary structure. The antenna system 104 in accordance with embodiments of the present disclosure can be operated to receive, transmit, or transmit and receive electromagnetic signals or beams 116. The electromagnetic signals 116 can include communication signals sent between the antenna 104 and communication system base stations 120, mobile devices 124, or other communication devices, signals sent as part of radar systems to determine the presence and location of distant objects 128, signals received from other transmission sources that the antenna is operational to detect as part of a signal detection or threat warning system, or any other purpose.

Figure 2:
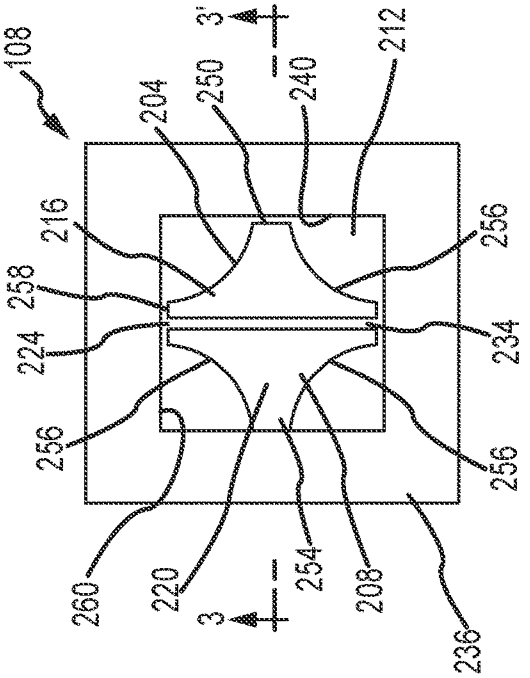
FIG. 2 depicts an antenna element in accordance with embodiments of the present disclosure in a plan view.
Figure 3A:
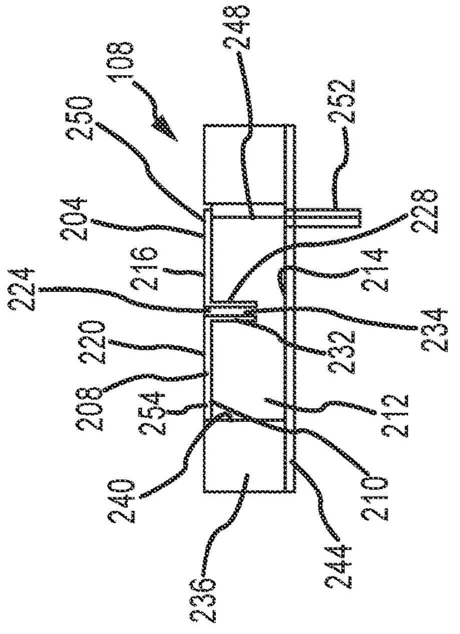
FIGS. 3A and 3B depict embodiments of the antenna element of FIG. 2 in cross-section views.
Figure 3B:
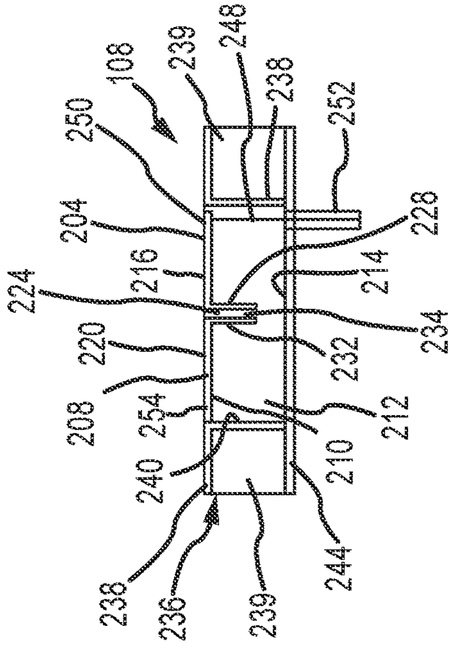

FIGS. 2, 3A and 3B depict an antenna element 108 in accordance with embodiments of the present disclosure in perspective and cross-section views respectively. More particularly, FIG. 2 depicts an example antenna element 108 in plan view, and FIGS. 3A and 3B depict embodiments of the example antenna element 108 in elevation along a cross-section taken along line 3-3' of FIG. 2. The antenna element 108 includes a first arm 204 and a second arm 208. The arms 204 and 208 are electrically conductive. The first arm 204 can include a main or central portion 216 disposed on a first surface 210 of the substrate 212 and the second arm 208 can include a main or central portion 220 disposed on the first surface 210 of the substrate 212. A capacitive gap 224 separates the first arm 204 from the second arm 208. In addition, as shown in FIGS. 3A and 3B, the first arm 204 includes a perpendicular portion 228 that extends at an angle to the main portion 216 of the first arm 204, while the second arm 208 includes a perpendicular portion 232 that extends at an angle to the main portion 220 of the second arm 208. Accordingly, the perpendicular portion 228 of the first arm 204 is disposed opposite the perpendicular portion 232 of the second arm 208. Moreover, the first 228 and second 232 perpendicular portions are separated from another by the capacitive gap 224. In accordance with at least some embodiments of the present disclosure, the perpendicular portions 228 and 232 can be perpendicular to the respective main portions 216 and 220. In addition, at least in portions along the capacitive gap 224, the perpendicular portions 228 and 232 can be parallel to one another. Moreover, the capacitive gap 224 between all or some of the space between the perpendicular portions 228 and 232 can be occupied by a dielectric material 234. The dielectric material 234 can include a dielectric material that is the same as or different than the dielectric material or materials that are used to form the substrate 212. In accordance with further embodiments of the present disclosure, the dielectric material 234 in the gap 224 can be integral to the substrate 212.

In accordance with at least some embodiments of the present disclosure, the perpendicular portions 228 and 232 have the same area and shape. Moreover, the perpendicular portions 228 and 232 can be rectangular in form. In accordance with alternate embodiments of the present disclosure, the perpendicular portions 228 and 232 are not limited to any particular shape, or to having the same areas as one another. Moreover, it should be appreciated that the perpendicular portions 228 and 232 are described as "perpendicular" or "vertical" to clarify that they are at an angle relative to the main portions 216 and 220 of the respective arms 204 and 208, but are not strictly required to be exactly perpendicular to the main portions 216 and 220 of the respective arms 204 and 208 or "vertical" within the antenna element 108. Instead, the perpendicular portions 228 and 232 merely need to generally face one another, thereby forming a capacitive gap 224 between them.

The arms 204 and 208 of the antenna element 108 and the substrate 212 are generally disposed within a housing 236. In accordance with at least some embodiments of the present disclosure, the housing 236 can include a portion of the structure of a platform 112 to which the antenna system 104 incorporating the antenna element 108 is connected. Moreover, the housing 236 can include a volume or aperture 240 in which the arms 204 and 208 and the substrate 212 are disposed. The housing 236 can include or can be formed from an electrically conductive material, such as but not limited to a metal, a conductive composite, or a layered or multiple component structure with conductive surfaces. For example, FIG. 3A depicts an embodiment in which the housing 236 is entirely formed from an electrically conductive material. As another example, FIG. 3B depicts an embodiment in which the housing 236 has an electrically conductive layer 238 disposed on a core 239 that may or may not be electrically conductive. For instance, where the antenna element 108 is formed using printed antenna board type techniques, the conductive layer 238 can include a top metal layer that also forms the main portions 216 and 220 of the arms 204 and 208, and a plated portion that extends from the top metal layer to the ground plane 244, defining some or all of the walls of the aperture 240. In general, at least an area around the aperture 240 that surrounds and that is on the same plane or layer as the arms 204 and 208, and that surrounds the substrate 212, is electrically conductive. In accordance with further embodiments, the entire extent of the housing 236 can be electrically conductive. In accordance with at least some embodiments of the present disclosure, the housing 236 is integral to or integrated with a structure of a vehicle or platform 112.

A ground plane 244 extends across a second side or surface 214 of the substrate 212 opposite the first side or surface 210 on which the arms 204 and 208 are disposed. The ground plane 244 is electrically connected to the housing 236. In accordance with at least some embodiments of the present disclosure, the ground plane 244 extends along at least portions of the housing 236. A feed via 248 connects a feed end 250 of the first arm 204 to a feed line 252. As an example, but without limitation, the feed line 252 can include a coaxial cable with a center conductor that is connected to the feed via 248, and an outer conductor or shield that is connected to the ground plane 244. The housing 236 is spaced apart from the first arm 204, but is in contact with (and thus is in electrical contact with) the second arm 208 at a terminal end 254 of the second arm 208 opposite the perpendicular portion 232.

In accordance with at least some embodiments of the present disclosure, the main portions 216 and 220 of the arms 204 and 208 respectively have the same area and shape as one another. Moreover, the main portions 228 and 232 can have a maximum width at or adjacent the perpendicular portions 228 and 232, and a minimum width adjacent the respective end portions 250 and 254. Accordingly, the main portions 228 and 232 can be tapered in form in a plan view. In accordance with alternate embodiments of the present disclosure, the arms 204 and 208 are not limited to any particular shape or to having the same areas as one another.

In accordance with at least some embodiments of the present disclosure, edge portions 256 extending between the ends of the arms 204 and 208 adjacent the housing 236 and the end adjacent the capacitive gap 224 can be flared or curved. As a result, the impedance of the arms 204 and 208 is tapered. For example, and as depicted in FIG. 2, the edge portions 256 of the first arm 204 can be tapered such that a line tangent to the edge portion 256 is parallel to a side edge 260 of the aperture 240 at a portion of the first arm 204 adjacent the feed end 250, and the angle of a line tangent to the edge portion 256 of the first arm 204 can generally increase until, adjacent a transition portion 258 between the edge 256 and the perpendicular portion 228, the edge 256 is perpendicular to the side edge 260 of the aperture 240. The taper of the edge 256 of the second arm 208 can mirror the taper of the edge 256 of the first arm. In accordance with other embodiments, the edge portions 256 can be straight. The area of the perpendicular portions 228 and 232, the width of the capacitive gap 224 between the perpendicular portions 228 and 232, and the characteristics of the dielectric material 234 occupying the capacitive gap 224 can be selectively configured to provide a desired capacitance.

In accordance with embodiments of the present disclosure, a top surface of the housing 236 and top surfaces of the arms 204 and 208 are the same distance from the ground plane 244. For example, but without limitation, where the antenna element 108 incorporates a circuit board, at least the top surfaces of the housing 236 and the arms 204 and 208 can be formed from the same conductive layer as one another. Moreover, in accordance with embodiments of the present disclosure, the perpendicular portions 228 and 232 are spaced apart from the ground plane 244 by an amount that is sufficient to prevent coupling between those perpendicular portions 228 and 232 and the ground plane 244. As an example, but without limitation, the perpendicular portions 228 and 232 can extend for about one-half the distance between the main portions 216 and 220 of the arms 204 and 208 and the ground plane 244. In accordance with at least some embodiments of the present disclosure, the perpendicular portions 228 and 232 can be formed by plating walls or trenches formed in or on the substrate 212.

Figure 4:
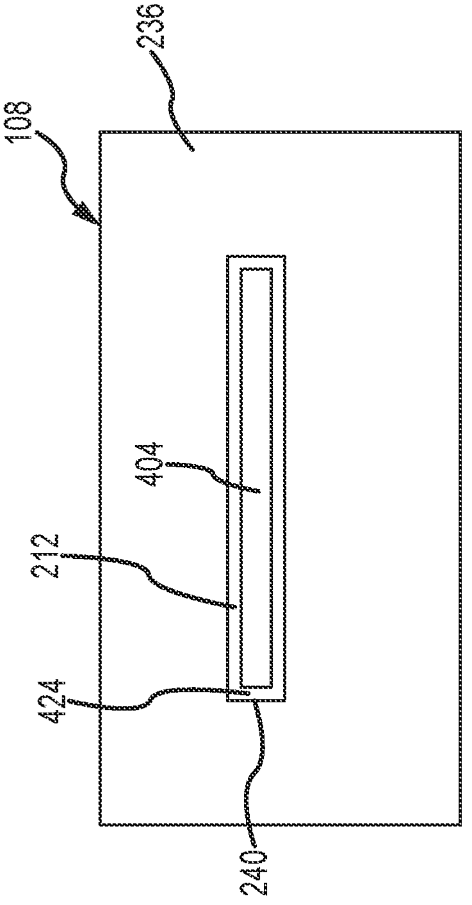
FIG. 4 depicts an antenna element in accordance with other embodiments of the present disclosure in a plan view.
Figure 5A:
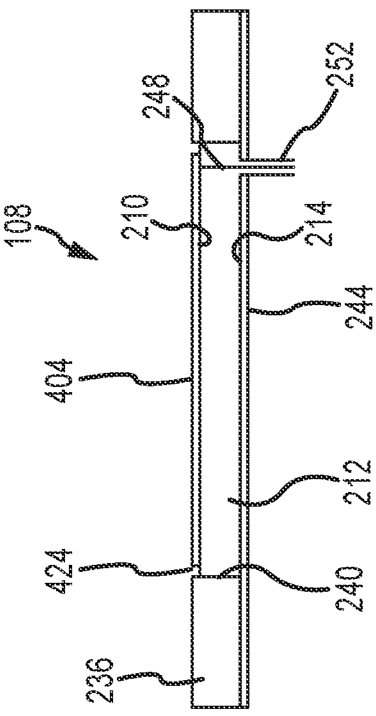
FIGS. 5A and 5B depict embodiments of the antenna element of FIG. 4 in cross-section views.
Figure 5B:
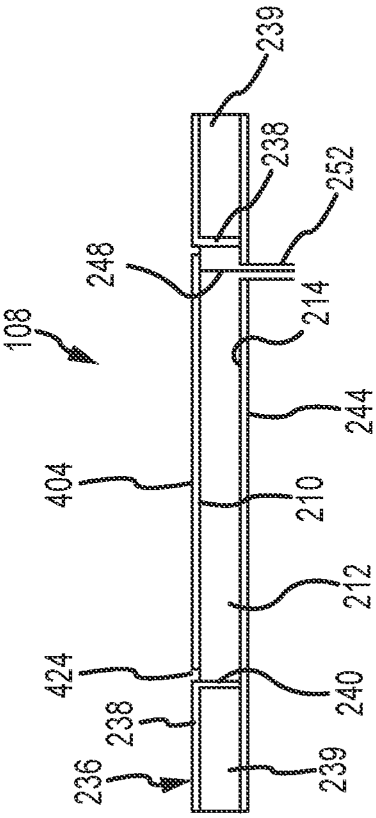

FIGS. 4, 5A and 5B depict an antenna element 108 in accordance with other embodiments of the present disclosure in perspective and cross-section views respectively. The antenna element 108 in these embodiments includes a single arm 404 disposed on a first surface 210 of a substrate 212. In at least some embodiments, the arm 404 is generally configured as a planar element disposed on a surface of the substrate 212. The length of the arm 404 is relatively large compared to the width of the arm 404. The arm 404 and substrate 212 are disposed within an aperture 240 formed in a housing 236. As in other embodiments, the housing 236 can include a portion of the structure of a platform 112 to which the antenna system 104 incorporating the antenna element 108 is connected. At least a portion of the surface of the housing 236 in a same layer or, for a least some embodiments in which the top surface of the element 108 is planar, the same plane, as the arm 404 and forming the sides of the volume or aperture 240 are electrically conductive. A ground plane 244 extends across a second side or surface 214 of the substrate 212 opposite the first side or surface 210 on which the arm 404 is disposed. The ground plane 244 is electrically joined to the housing 236. Moreover, as shown, the ground plane 244 can extend along at least a portion of the housing 236. A feed via 248 connects the arm 404 to a feed line 252. As an example, but without limitation, the feed line 252 can include a coaxial cable with a center conductor that is connected to the feed via 248, and an outer conductor or shield that is connected to the ground plane 244.

In accordance with embodiments of the present disclosure, the housing 236 is spaced apart from the arm 404. In the antenna element 108 depicted in FIGS. 4, 5A and 5B, a capacitive gap 424 separates an end of arm 404 opposite the end connected to the feed via 248 from the housing 236, and in particular from an edge of the aperture 240. FIG. 5A depicts an embodiment in which the housing 236 is formed entirely from an electrically conductive material. As another example, FIG. 5B depicts an embodiment in which the housing 236 has an electrically conductive layer 238 disposed on a core 239 that may or may not be electrically conductive. For instance, where the antenna element 108 is formed using printed antenna board type techniques, the conductive layer 238 can include a top metal layer that also forms the arm 404, and a plated portion that extends from the top metal layer to the ground plane 244, defining some or all of the walls of the aperture 240. In general, at least an area around the aperture 240 that surrounds and that is on the same plane or layer as the arms 204 and 208, and that surrounds the substrate 212, is electrically conductive. In accordance with further embodiments, the entire extent of the housing 236 can be electrically conductive. In accordance with at least some embodiments of the present disclosure, the housing 236 is integral to or integrated with a structure of a vehicle or platform 112.

Figure 6:
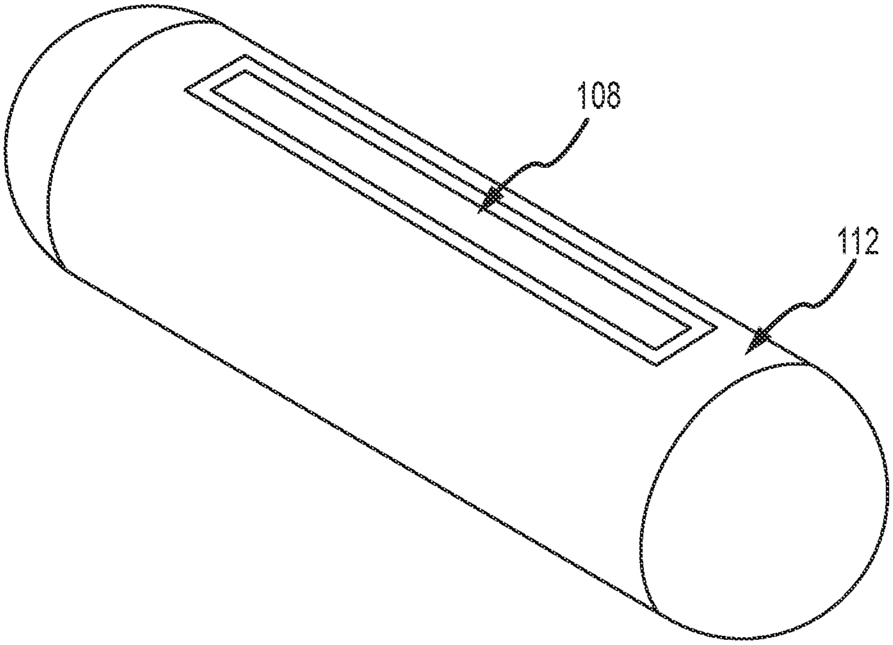
FIG. 6 depicts the antenna element of FIG. 4 disposed along the length of a platform.
Figure 7:
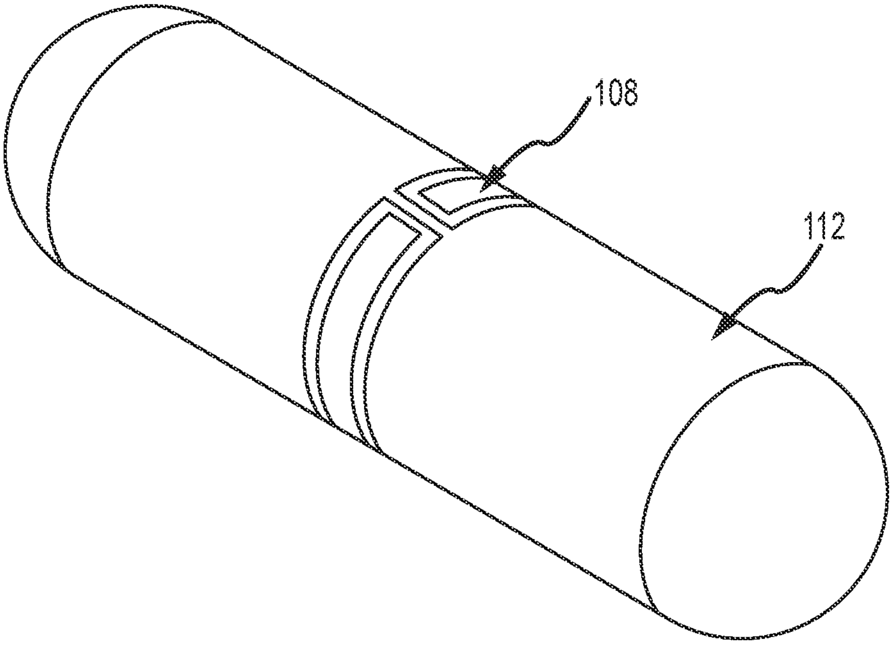
FIG. 7 depicts the antenna element of FIG. 4 disposed around the outer diameter of a cylindrical platform.

In accordance with embodiments of the present disclosure, an antenna element 108 can be configured to conform to a surface of a platform 112. Accordingly, depending on the surface features of the area in which the antenna element 108 is disposed, the antenna element 108 can be entirely or partially planar, curved or contoured. For example, as depicted in FIG. 6, an antenna element 108 can be disposed along the length of a platform 112 having a generally cylindrical outer surface, in which case the antenna element 108 can be curved in a width dimension. As another example, as depicted in FIG. 7, an antenna element 108 can be disposed around an outer diameter of a cylindrical platform 112, in which case the antenna element 108 can be curved in a length dimension. Moreover, the housing 236 of an antenna element 108 as disclosed herein can be an integral part of the platform, or can be integrated with the platform 112. For instance, the surface of the housing 236 or a layer disposed directly on a surface of the housing 236 can form an exterior surface of a platform 112 to which the antenna element 108 is mounted. Although the example conformal implementations shown in FIGS. 6 and 7 each depict an antenna element 108 having a single arm 404, embodiments including two arms 204 and 208 can also be configured as part of a conformal element 108. Moreover, any of the various embodiments can be disposed within an enclosure or housing 236 that is part of a structure forming an exterior surface or other portion of a platform 112.

Figure 8:
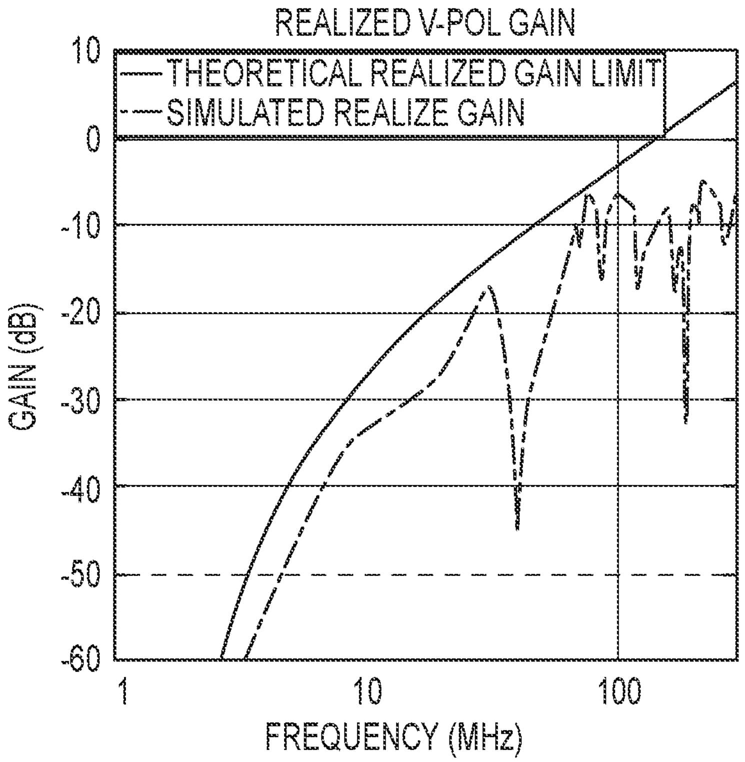
FIG. 8 depicts a gain pattern for an example antenna configuration.

An antenna element 108 in accordance with embodiments of the present disclosure provides a capacitive gap 224, 424 that can be balanced with the length of the inductive loop formed by the conductive components of the element 108 to provided desired resonant frequency. In particular, a resonant loop antenna or antenna element 108 in accordance with embodiments of the present disclosure works by creating a capacitance within an oscillating current loop. The capacitance of the gap 224, 424 combined with the inductance of the loop creates an electrical resonance at a wavelength much smaller that the physical size of the antenna. Accordingly, embodiments of the present disclosure allow the operative frequency of the antenna element 108 to be relatively low compared to alternative antenna configurations of the same electrical size. For example, embodiments of the present disclosure can provide an antenna with over 160% fractional bandwidth. Moreover, an antenna topology in accordance with embodiments of the present disclosure can have a kr of nearly 0.04 (5× smaller than currently published designs). FIG. 8 depicts the gain pattern for an example antenna element 108 configured in accordance with embodiments of the present disclosure, for example as illustrated in FIGS. 2 and 3, as compared to the theoretical limit for a conventional antenna of equivalent size and fractional bandwidth. As is apparent from the figure, an antenna 108 as disclosed herein provides a wide bandwidth for the electrical size of the antenna 108.

Figure 9:
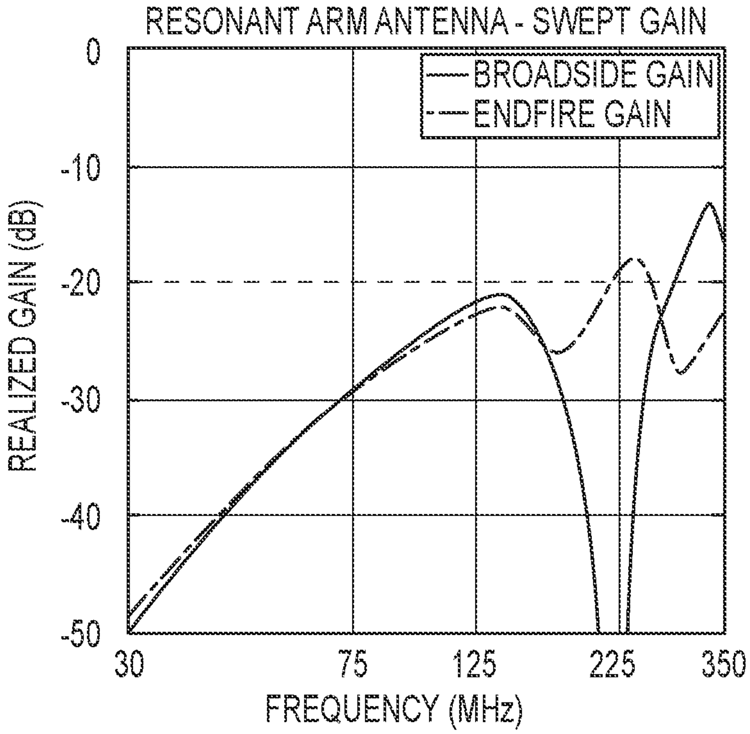
FIG. 9 depicts a gain pattern for another example antenna configuration.
Figure 10:
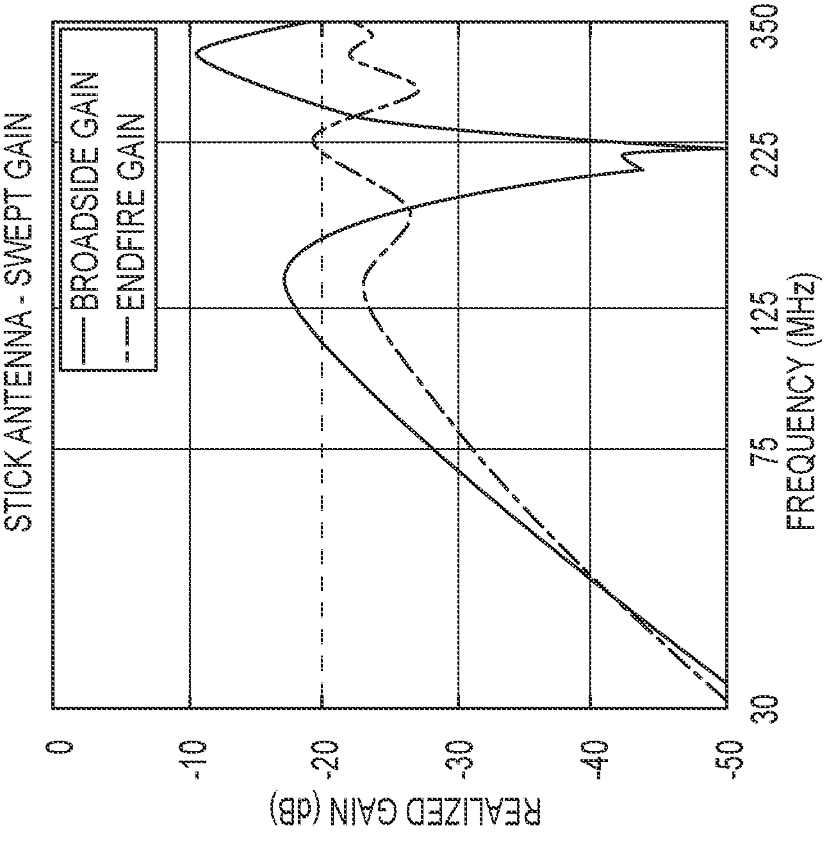
FIG. 10 depicts a gain pattern for an example stick configuration.
Figure 11:
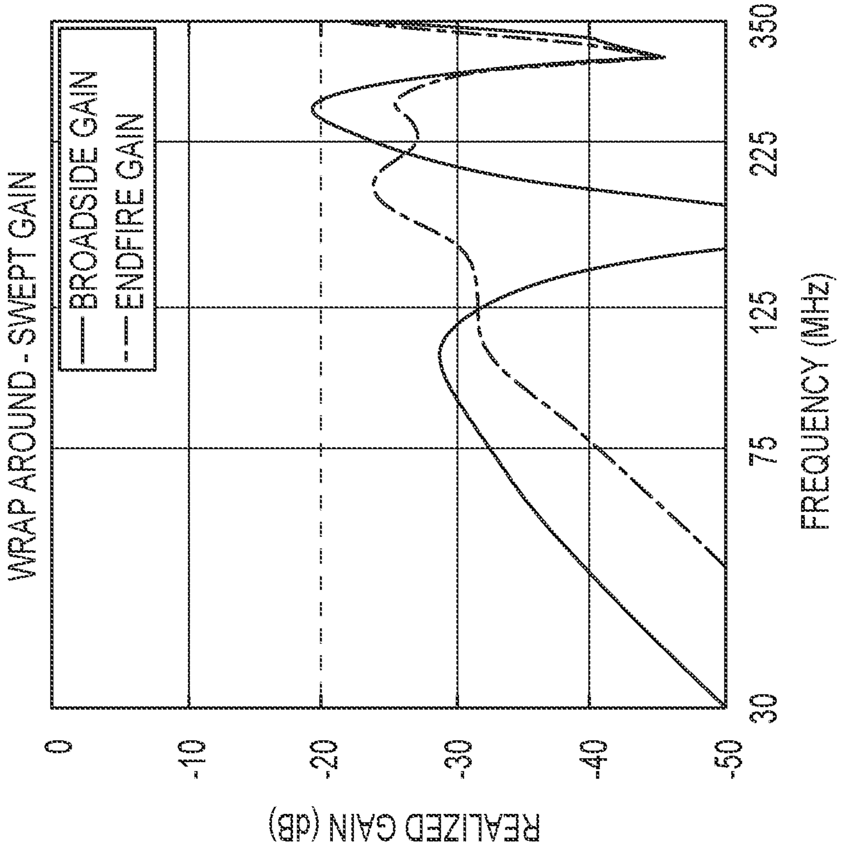
FIG. 11 depicts a gain pattern for an example wrap around configuration.

As a particular example, but without limitation, an antenna element 108 shown in FIGS. 2 and 3 with dimensions of approximately 24"×24"×6" radiates in the 3-30 MHz band (kr=0.04) as shown in FIG. 8. Since some platforms cannot accommodate this size an alternative design is shown in FIGS. 4 and 5. This antenna element 108 is approximately 16"×2"×0.5" and radiates in the 30-350 MHz band (kr=0.25) as shown in FIG. 9. Although a broadside null occurs at approximately 225 MHz due to the second order radiation pattern resonating, the gain of the radiation pattern at a 10 degree elevation (endfire curves) is fairly consistent. An antenna element 108 in accordance with embodiments of the present disclosure, can be mounted on a 7" diameter cylinder in either a stick (FIG. 6) or wrap-around configuration (FIG. 7). Associated swept gain patterns are shown in FIG. 10 (for the stick antenna configuration), and in FIG. 11 (for the wrap-around configuration). Although the gain is reduced in the wrap-around configuration, the FOV is increased. End fire gain reduction is largely due to the polarization being tangent to the ground plane.

The foregoing discussion of the disclosed systems and methods has been presented for purposes of illustration and description. Further, the description is not intended to limit the disclosed systems and methods to the forms disclosed herein. Consequently, variations and modifications commensurate with the above teachings, within the skill or knowledge of the relevant art, are within the scope of the present disclosure. The embodiments described herein are further intended to explain the best mode presently known of practicing the disclosed systems and methods, and to enable others skilled in the art to utilize the disclosed systems and methods in such or in other embodiments and with various modifications required by the particular application or use. It is intended that the appended claims be construed to include alternative embodiments to the extent permitted by the prior art.

What is claimed is:

1. An antenna element, comprising:
a substrate;
a first arm, wherein at least a portion of the first arm is disposed on a first surface of the substrate;
a second arm, wherein at least a portion of the second arm is disposed on the first surface of the substrate;
a housing, wherein the first arm and the second arm are disposed within an aperture formed in the housing; and
a capacitive gap, wherein the first arm extends from a feed end adjacent but spaced apart from a first edge of the aperture and towards the capacitive gap, wherein a width of the first arm increases with distance from the first edge of the aperture, wherein the second arm extends from a terminal end in contact with a second edge of the aperture and towards the capacitive gap, and wherein a width of the second arm increases with distance from the second edge of the aperture.

2. The antenna element of claim 1, wherein the first arm includes a main portion between the feed end and the capacitive gap and a perpendicular portion adjacent the capacitive gap, wherein the second arm includes a main portion between the terminal end and the capacitive gap and a perpendicular portion adjacent the capacitive gap, and wherein the main portions are disposed on the first surface of the substrate.

3. The antenna element of claim 2, wherein the substrate includes a second surface that is opposite the first surface, and wherein the perpendicular portions extend from the respective main portions toward the second surface of the substrate.

4. The antenna element of claim 3, wherein the perpendicular portions of the first and second arms are parallel to one another.

5. The antenna element of claim 4, wherein the perpendicular portions of the first and second arms are perpendicular to the main portions of the first and second arms.

6. The antenna element of claim 2, wherein the substrate includes a dielectric material.

7. The antenna element of claim 6, wherein a portion of the substrate is disposed in the capacitive gap, between the perpendicular portion of the first arm and the perpendicular portion of the second arm.

8. The antenna element of claim 1, further comprising:
a ground plane, wherein the ground plane extends along a second surface of the substrate opposite the first surface on which the first and second arms are disposed.

9. The antenna element of claim 8, further comprising a feed via, wherein the feed via is connected to the feed end of the first arm.

10. The antenna element of claim 1, wherein the antenna element is disposed on or adjacent an exterior surface of a platform.

11. An antenna element, comprising:
a substrate;
a first arm, wherein at least a portion of the first arm is disposed on a first surface of the substrate;
a second arm, wherein at least a portion of the second arm is disposed on the first surface of the substrate;
a housing, wherein the first and second arms and the substrate are disposed within an aperture formed in the housing; and a capacitive gap, wherein the capacitive gap is disposed between the first and second arms, wherein a main portion of the first arm increases in width from a portion of the first arm adjacent a feed end toward a portion of the first arm adjacent the capacitive gap, wherein a main portion of the second arm decreases in width from a portion of the second arm adjacent the capacitive gap toward a terminal end, wherein the feed end of the first arm is spaced apart from the housing, wherein the terminal end of the second arm is in electrical contact with the housing, wherein edge portions of the first arm, between the feed end and the portion of the first arm adjacent the capacitive gap, are curved, and wherein edge portions of the second arm, between the portion of the second arm adjacent the capacitive gap and the terminal end, are curved.

12. The antenna element of claim 11, wherein the first arm includes a perpendicular portion adjacent the capacitive gap, and wherein the second arm includes a perpendicular portion adjacent the capacitive gap.

13. The antenna element of claim 12, wherein the substrate includes a second surface that is opposite the first surface, and wherein the perpendicular portions extend from the respective main portions toward the second surface of the substrate.

14. The antenna element of claim 13, wherein the perpendicular portions of the first and second arms are parallel to one another.

15. The antenna element of claim 14, wherein the perpendicular portions of the first and second arms are perpendicular to the main portions of the first and second arms.

16. The antenna element of claim 11, further comprising:

a ground plane, wherein the ground plane extends along a second surface of the substrate opposite the first surface on which the first and second arms are disposed.

17. An antenna, comprising:

a housing, wherein an aperture is formed in the housing;

a substrate, wherein the substrate is disposed within the aperture;

a first arm, wherein the first arm is disposed on a first surface of the substrate and within an area of the aperture;

a second arm, wherein the second arm is disposed on the first surface of the substrate and within an area of the aperture;

a capacitive gap, wherein the capacitive gap is disposed between the first and second arms; and a ground plane, wherein the ground plane is disposed on and is in contact with a second surface of the substrate, wherein the second surface of the substrate is opposite the first surface of the substrate, wherein the first arm includes a feed portion, a main portion, and a perpendicular portion, wherein the second arm includes a terminal portion, a main portion, and a perpendicular portion, wherein the main portions of the first and second arms are on the first surface of the substrate, wherein the perpendicular portions of the first and second arms extend from the first surface of the substrate, into the substrate, and towards the ground plane, wherein the perpendicular portions of the first and second arms are separated from one another by the capacitive gap, and wherein a portion of the substrate is disposed in the capacitive gap.

18. The antenna of claim 17, wherein the feed portion of the first arm is disposed on the first surface of the substrate and is spaced apart from the housing, and wherein the terminal portion of the second arm is disposed on the first surface of the substrate and is in electrical contact with the housing.

19. The antenna of claim 18, further comprising:

a feed via, wherein the feed portion of the first arm is connected to the feed via.

* * * * *